(12) United States Patent
Katsurao et al.

(10) Patent No.: US 8,574,770 B2
(45) Date of Patent: Nov. 5, 2013

(54) VINYLIDENE FLUORIDE COPOLYMER-BASED POLYMER ELECTROLYTE FOR NONAQUEOUS BATTERY RETAINING LARGE PROPORTION OF ELECTROLYTIC SOLUTION

(75) Inventors: Takumi Katsurao, Fukushima-ken (JP); Katsuo Horie, Fukushima-ken (JP); Yukio Ichikawa, Fukushima-ken (JP); Aisaku Nagai, Fukushima-ken (JP)

(73) Assignee: Kureha Corporation, Tokyo (JP)

( * ) Notice: Subject to any disclaimer, the term of this patent is extended or adjusted under 35 U.S.C. 154(b) by 0 days.

(21) Appl. No.: 13/238,250

(22) Filed: Sep. 21, 2011

(65) Prior Publication Data
US 2012/0009482 A1    Jan. 12, 2012

Related U.S. Application Data

(62) Division of application No. 12/285,736, filed on Oct. 14, 2008, now Pat. No. 8,043,386, which is a division of application No. 10/848,003, filed on May 19, 2004, now Pat. No. 7,452,387, which is a division of application No. 09/582,432, filed as application No. PCT/JP98/05848 on Dec. 24, 1998, now Pat. No. 6,824,927.

(30) Foreign Application Priority Data

Dec. 26, 1997 (JP) .................................. 9-366969

(51) Int. Cl.
*H01M 6/14* (2006.01)
(52) U.S. Cl.
USPC ............ 429/300; 429/303; 429/309; 429/316
(58) Field of Classification Search
USPC ............. 429/316, 317, 306, 309, 303, 231.9, 429/324, 300; 29/623.1; 521/27–29; 252/62.2
See application file for complete search history.

(56) References Cited

U.S. PATENT DOCUMENTS

| | | | | |
|---|---|---|---|---|
| 4,731,288 A | * | 3/1988 | Mizuno et al. | 428/333 |
| 4,784,915 A | * | 11/1988 | Sakagami et al. | 428/421 |
| 5,296,318 A | * | 3/1994 | Gozdz et al. | 429/316 |
| 5,429,891 A | * | 7/1995 | Gozdz et al. | 429/316 |
| 5,571,634 A | | 11/1996 | Gozdz et al. | |
| 5,922,493 A | * | 7/1999 | Humphrey et al. | 429/316 |
| 6,051,343 A | | 4/2000 | Suzuki et al. | |
| 6,077,624 A | | 6/2000 | Mitchell et al. | |
| 6,284,412 B1 | | 9/2001 | Minakata et al. | |

FOREIGN PATENT DOCUMENTS

| | | |
|---|---|---|
| EP | 0 730 316 | 9/1996 |
| EP | 0 793 286 | 9/1997 |
| JP | 6-318454 | 11/1994 |
| JP | 7-296815 | 10/1995 |
| JP | 9-289023 | 11/1997 |
| JP | 9-306462 | 11/1997 |
| WO | WO 97/18596 | 5/1997 |
| WO | WO 98/38687 | 9/1998 |

OTHER PUBLICATIONS

Tsuchida, E., et al. "Conduction of Lithium Ions in Polyvinylidene Fluoride and Its Derivatives-I", Electrochimica Acta, vol. 28, No. 5, (May 1, 1983), pp. 591-595.
International Search Report dated Apr. 13, 1999 issued in PCT/JP98/05848 corresponding to present U.S. application.

* cited by examiner

*Primary Examiner* — Raymond Alejandro
(74) *Attorney, Agent, or Firm* — Wenderoth, Lind & Ponack, L.L.P.

(57) ABSTRACT

A non-aqueous battery comprising a positive electrode material capable of being doped with and liberating lithium, a negative electrode material capable of being doped with and liberating lithium, and a polymer electrolyte disposed between the positive and negative electrode materials. The polymer electrolyte is formed by mixing a vinylidene fluoride copolymer and a nonaqueous electrolytic solution with a solvent, followed by evaporation of the solvent, so as to retain a high proportion of the nonaqueous electrolytic solution, leading to high electroconductivity and excellent strength in this state. The vinylidene fluoride copolymer comprises 80 to 97 wt. % of vinylidene fluoride monomer units and 3 to 20 wt. % of units of at least one monomer copolymerizable with vinylidene fluoride monomer, and has an inherent viscosity of 1.7 to 7 dl/g, as measured at 30° C. in a solution at a concentration of 4 g of polymer in 1 liter of N,N-dimethylformamide.

6 Claims, 1 Drawing Sheet

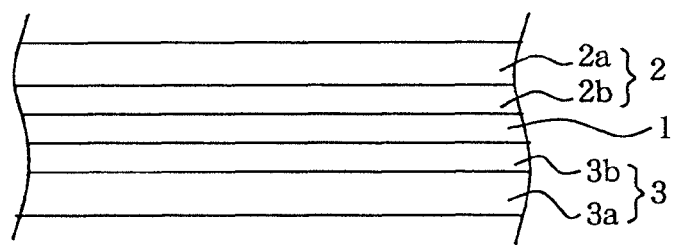

VINYLIDENE FLUORIDE COPOLYMER-BASED POLYMER ELECTROLYTE FOR NONAQUEOUS BATTERY RETAINING LARGE PROPORTION OF ELECTROLYTIC SOLUTION

This application is a Divisional of Ser. No. 12/285,736 filed Oct. 14, 2008, now U.S. Pat. No. 8,043,386, which is a Divisional application of Ser. No. 10/848,003 filed May 19, 2004, now U.S. Pat. No. 7,452,387, which is a Divisional application of Ser. No. 09/582,432 filed Jun. 26, 2000, now U.S. Pat. No. 6,824,927, which is a National Phase Application of PCT/JP98/05848 filed Dec. 24, 1998.

TECHNICAL FIELD

The present invention relates to a nonaqueous battery, particularly a lithium ion battery, and a nonaqueous battery containing the electrolyte.

BACKGROUND ART

The development of electronic technology in recent years is remarkable, and various apparatus and devices have been reduced in size and weight. Accompanying the reduction in size and weight of such electronic apparatus and devices, there has been a remarkably increasing demand for reduction in size and weight of a battery as a power supply for such electronic apparatus and devices. As a battery capable of providing a large energy at small volume and weight, a nonaqueous secondary battery using lithium has been used as a power source for principally small-sized electronic appliances, such as portable telephone sets, personal computers and video cam coders, used at home. For the purpose of providing the lithium nonaqueous secondary battery with increased shape latitude, e.g., formation into a very small thickness on the order of 0.5 mm, extensive development work has been made on polymer electrolyte batteries.

A polymer electrolyte containing no electrolytic solution hardly satisfies properties required for application to batteries because of, e.g., low ionic conductivity and small battery discharge capacity. In contrast thereto, a polymer gel electrolyte containing electrolytic solution has called an attention because of a high ionic conductivity. As such a polymer electrolyte, U.S. Pat. No. 5,296,318 has reported a polymer electrolyte using a copolymer of vinylidene fluoride with 8 to 25 wt. % of hexafluoropropylene. Further, as a technique for impregnating the copolymer with an increased amount of electrolytic solution, U.S. Pat. No. 5,456,000 has disclosed a technique of mixing the copolymer with a plasticizer, then extracting the plasticizer and then effecting the impregnation with a nonaqueous electrolytic solution. According to this technique, it is possible to effect the impregnation with a large amount of electrolytic solution, but such impregnation with a large amount of electrolytic solution is accompanied with a problem of losing a shape latitude, such as the formation into a very small thickness. Further, as the technique essentially involves a step of extracting the plasticizer, the productivity becomes inferior. Further, complete extraction of a plasticizer is difficult, and a portion of the plasticizer remaining in the polymer electrolyte is liable to exert an adverse effect to the battery prepared by using the electrolyte.

In order to obtain a polymer electrolyte battery having a high shape latitude, it is essential to provide a polymer gel electrolyte capable of containing a large amount of electrolytic solution so as to enhance the ionic conductivity and yet exhibiting a large strength. However, the strength of a gel is lowered at a larger content of electrolytic solution, so that it has been impossible to satisfy a gel strength and a content of electrolytic solution in combination, and no polymer gel electrolyte suitable for providing a polymer electrolyte battery having a high shape latitude has been known.

In order to increase the gel strength, it is considered important to provide an enhanced modulus of elasticity to the gel. Factors controlling the elasticity modulus of a gel have been generally obscure except that a higher polymer concentration provides a higher elasticity modulus (but this results in a lower content of electrolytic solution in the polymer electrolyte and is thus not practical), and it has been reported that an increase in polymer molecular weight does not result in a change in elasticity modulus with respect to κ carrageenans gel by Rochas, C. et al, Carbohydrate Polymers, 12, 255-266 (1990). In this way, as general guiding principles for enhancing the gel strength, none have been known except for relying on a higher polymer concentration. Accordingly, a practical polymer electrolyte capable of being impregnated with a large amount of nonaqueous electrolytic solution and yet having an excellent strength, has not been known.

Further, in the case of being impregnated with a large amount of nonaqueous electrolytic solution, it is necessary to stably retain the solution and prevent the solution from leaking out of the polymer electrolyte. If the nonaqueous electrolytic solution cannot be stably retained and a large amount of leakage thereof is caused, it becomes impossible to obviate damages and deterioration of electrical properties of apparatus and devices surrounding the battery.

DISCLOSURE OF INVENTION

The present invention aims at providing a polymer electrolyte capable of being impregnated with a large amount of nonaqueous electrolytic solution and stably retaining the electrolytic solution and yet exhibiting excellent strength, and further a nonaqueous battery having a large shape latitude by using the polymer electrolyte.

According to the inventors' study for accomplishing the above objects, it has been found very preferable to use a polymer electrolyte, comprising: a vinylidene fluoride copolymer and a nonaqueous electrolytic solution, wherein the vinylidene fluoride copolymer comprises 80 to 97 wt. % of vinylidene fluoride monomer units and 3 to 20 wt. % of units of at least one monomer copolymerizable with vinylidene fluoride monomer and has an inherent viscosity of 1.5 to 10 dl/g. Herein, "inherent viscosity" is used as a measure of polymer molecular weight and refers to a logarithmic viscosity number as measured at 30° C. of a solution formed by dissolving 4 g of a polymer resin in 1 liter of N,N-dimethylform-amide.

BRIEF DESCRIPTION OF THE DRAWINGS

FIG. 1 is a sectional view in a thickness-wise direction of a nonaqueous battery using a polymer electrolyte according to the present invention.

EMBODIMENTS OF THE INVENTION

The polymer electrolyte according to the present invention comprises a vinylidene fluoride copolymer and a nonaqueous electrolytic solution, wherein the vinylidene fluoride copolymer comprises 80 to 97 wt. % of vinylidene fluoride monomer units and 3 to 20 wt. % of units of one or plural species of monomer copolymerizable with vinylidene fluoride monomer and has an inherent viscosity of 1.5 to 10 dl/g, preferably 1.7 to 7 dl/g.

As a polymer matrix capable of keeping electrochemical stability while containing an electrolytic solution in a lithium nonaqueous secondary battery, it is possible to suitably use, e.g., a vinylidene fluoride-hexafluoropropylene or a vinylidene fluoride-trifluorochloroethylene copolymer. If the content of the monomer other than vinylidene fluoride is below 3 wt. %, the content of the electrolytic solution cannot be increased, and if the vinylidene fluoride monomer content is below 80 wt. %, the liquid-retentivity of the polymer electrolyte is lowered in the case of retaining a large amount of electrolytic solution, thus being liable to cause the exudation of the electrolytic solution, so that the vinylidene fluoride monomer unit content should be in the range of 80 wt. % to 97 wt. %. A ternary copolymer comprising hexafluoropropylene and trifluorochloroethylene in a total amount of 3-20 wt. % in addition to 80-97 wt. % of vinylidene fluoride, may also be preferably used.

The vinylidene copolymer may be produced through a process, such as suspension polymerization, emulsion polymerization or solution polymerization, and the polymerization process need not be particularly restricted. For the purpose of, e.g., improving the properties of the resultant polymer electrolyte, it is possible to adjust a method of adding copolymerizable monomers, a polymerization temperature, etc. As for the method of adding copolymerizable monomers, e.g., in the case of copolymerization of vinylidene fluoride and hexafluoropropylene, the polymerization of vinylidene fluoride and hexafluoropropylene charged simultaneously can provide a polymer resulting in a polymer electrolyte capable of exhibiting a higher strength and a higher liquid-retentivity and is therefore advantageous than in the case of polymerization of vinylidene fluoride and hexafluoropropylene charged in division or continuously. As for the polymerization temperature, a higher temperature provides a polymer resulting in a polymer electrolyte exhibiting a higher liquid-retentivity and is therefore advantageous. A temperature of 25° C. or higher is generally suitable. In the case of suspension polymerization, for example, a temperature of 25° C.-50° C. is suitable at the initial stage but it is also preferred to raise the temperature up to ca. 80° C. at a later stage. Further, in the case of emulsion polymerization, it is possible to raise the temperature up to ca. 150° C. from the initial stage.

A vinylidene fluoride copolymer of a high liquid-retentivity obtained by such a relatively high polymerization temperature is characterized by an increase in abnormal linkage or different-type linkage (head-head or tail-tail linkage) at vinylidene fluoride sites formed of successive or adjacent vinylidene fluoride polymerized units as confirmed by NMR. Such an abnormal linkage content should preferably be at least 3% of vinylidene fluoride sites.

Incidentally, U.S. Pat. No. 5,296,318 has disclosed the use of a vinylidene fluoride copolymer having a relatively low vinylidene fluoride monomer unit content by including 8-25 wt. % of hexafluoropropylene so as to provide an increased impregnation content of nonaqueous electrolytic solution. In the present invention, however, even at a higher vinylidene fluoride content of, e.g., 93 wt. %, a high impregnation content of nonaqueous electrolytic solution can be attained together with a remarkably improved retentivity of non-aqueous electrolytic solution (see Examples 1, 4, etc., described later). While the reason therefor is not clear as yet, the effect is understood as an effect accompanying an increased inherent viscosity of at least 1.5 dl/g, i.e., an increased molecular weight, of the copolymer (see Examples and Comparative Examples described later).

If the polymer has an inherent viscosity of below 1.5 dl/g, the resultant polymer electrolyte is caused to have a weak strength at a high electrolytic solution content region usable as a battery, and a short circuit between the positive and negative electrodes is caused when a thin battery is formed and folded, so that the polymer electrolyte is difficult to use from a viewpoint of dynamical strength. There is observed a tendency that a higher inherent viscosity of polymer results in a polymer electrolyte exhibiting a higher strength, but above a certain inherent viscosity, the strength tends to be saturated. Moreover, an inherent viscosity in excess of 10 dl/g results in a problem in respect of productivity of the vinylidene fluoride that it becomes difficult to form a thick solution thereof in a volatile solvent.

More specifically, a vinylidene fluoride copolymer comprising 80-97 wt. % of vinylidene fluoride monomer units and 3-20 wt. % of one or plural species of monomer copolymerizable with vinylidene fluoride and having an inherent viscosity of 1.5-10 dl/g, allows easy formation of a gel film, which shows a good liquid-retentivity and a large film strength even in a gel state containing an electrolytic solution in an amount as large as 300 wt. % of the polymer (i.e., an electrolytic solution content in the gel of 75 wt. %), so that it is suitably used in a nonaqueous battery comprising a polymer electrolyte. The polymer electrolyte according to the present invention can be used in a state of containing an electrolytic solution at a large content of ordinarily 50 wt. % to 85 wt. %.

There is observed a tendency that a polymer electrolyte exhibits a higher lithium ionic conductivity at a higher electrolytic solution content. For example, the above-mentioned U.S. Pat. No. 5,296,318 discloses that gels having electrolytic solution contents in the range of 20 wt. %-70 wt. %, substantially 40-60 wt. %, show lithium ion conductivities ranging from $10^{-5}$ S/cm to $10^{-3}$ S/cm. Accordingly, it is ensured that the polymer electrolyte gel according to the present invention capable of exhibiting a higher electrolytic solution content of 50-85 wt. % in the polymer electrolyte exhibits a level of ionic conductivity sufficient for function as an actual battery material. Particularly, the polymer electrolyte according to the present invention shows a sufficient gel strength in a state of containing an electrolytic solution in a proportion as high as 85 wt. % as shown in Examples described later.

Examples of the monomer copolymerizable with vinylidene fluoride monomer may include: hydrocarbon monomers, such as ethylene and propylene; fluorine-containing monomers, such as vinyl fluoride, trifluoroethylene, trifluorochloroethylene, tetrafluoroethylene, hexafluoropropylene, and fluoroalkyl vinyl ether; carboxyl group-containing monomers, such as monomethyl maleate and monomethyl citraconate; and epoxy group-containing vinyl monomers, such as ally glycidyl ether and glycidyl crotonate, but these are not restrictive. It is however preferred to use vinylidene fluoride copolymers containing hexafluoropropylene and/or trifluoroethylene among the above.

The nonaqueous electrolytic solution constituting the gel-form polymer electrolyte according to the present invention together with a matrix of the above-mentioned vinylidene fluoride copolymer may, for example, be obtained by dissolving an electrolyte, such as a lithium salt, in a proportion of 5-30 wt. parts in 100 wt. parts of a nonaqueous solvent (organic solvent).

The electrolytes may for example include: $LiPF_6$, $LiAsF_6$, $LiClO_4$, $LiBF_4$, $LiCl$, $LiBr$, $LiCH_3SO_3$, $LiCF_3SO_3$, LiN $(CF_3SO_2)_2$ and $LiC(CF_3SO_2)_3$. The organic solvent for the electrolyte may for example include: propylene carbonate, ethylene carbonate, 1,2-diethoxyethane, 1,2-diethoxyethane, dimethyl carbonate, methyl ethyl carbonate, γ-butylolactone, methyl propionate, ethyl propionate, and solvent mixtures of these, but these are not restrictive.

The polymer electrolyte according to the present invention may be formed from the above-mentioned vinylidene fluoride copolymer resin (or a mixture thereof with another resin) and nonaqueous electrolytic solution, e.g., in the following manner. First, an electrolyte is dissolved in an organic solvent to form an electrolytic solution in a manner as described above. Then, a vinylidene fluoride resin is dissolved in a volatile organic solvent to form a solution, which is blended with the above nonaqueous electrolytic solution. Further, via a step of vaporizing the above-mentioned volatile organic solvent, a polymer electrolyte in the form of a film is obtained. The volatile organic solvent used in this instance may preferably be one which is readily volatile by having a high vapor pressure at a relatively low temperature and can well dissolve the vinylidene fluoride copolymer. Tetrahydrofuran, methyltetrahydrofuran, acetone, methyl ethyl ketone, 1,3-dioxalan, cyclohexanone, etc., may be used, but these are not restrictive.

Further, propylene carbonate, ethylene carbonate, dimethyl carbonate, etc., frequently used as an organic solvent for dissolving an electrolyte can per se be used as a solvent for the vinylidene fluoride copolymer, so that it is possible to form a polymer electrolyte without using a volatile organic solvent as described above. In this instance, it is possible to first dissolve a vinylidene fluoride copolymer in an organic solvent to form a solution and then add an electrolyte thereto for further dissolution, or to dissolve a vinylidene fluoride copolymer and an electrolyte simultaneously in an organic solvent. The resultant solution containing the vinylidene fluoride copolymer and the electrolyte is cooled to room temperature for gelation, thereby forming a film structure comprising a polymer electrolyte in the form of a film.

A basic structure of a nonaqueous battery using a polymer electrolyte according to the present invention may be obtained as shown in a sectional view of FIG. 1 by disposing a generally sheet-form polymer electrolyte in a sandwiched form between a pair of a positive electrode 2 (2a: electroconductive substrate, 2b: positive composite electrode layer) and a negative electrode 3 (3a: electroconductive substrate, 3b: negative composite electrode layer).

In the case of a lithium ion battery taken for example, the sheet-form polymer electrolyte 1 may preferably have a thickness of ca. 2-1000 μm, particularly ca. 10-200 μm, and it is preferred to use a nonaqueous electrolytic solution for impregnation in a proportion of 10-1000 wt. parts, particularly 100-500 wt. parts, for 100 wt. parts of the vinylidene fluoride copolymer.

Further, in order to provide an improved heat resistance, it is possible to crosslink the polymer electrolyte. As chemical crosslinking means, it is suitable to apply a vulcanization method for fluoroelastomer obtained by copolymerization of vinylidene fluoride with another monomer. More specifically, the crosslinking may be performed by adding a polyamine, a polyol or a polyfunctional crosslinking agent, and a radical generating agent.

Suitable examples of the polyamine used for chemical crosslinking may include dibutylamine, piperidine, diethylcyclohexylamine, hexamethylene-diamine, hexamethylenediamine carbamate, N,N'-dicinnamilidene-1,6-hexanediamine, and 4,4'-bis(aminocyclohexyl) metacarbamate, but these are not restrictive.

Suitable examples of the polyol may include 2,2-bis(4-hydroxyphenyl)propane, 2,2-bis (4-hydroxyphenyl) hexafluoropropane, hydroquinone, and 4,4'-dihydroxydiphenylmethane, but these are not restrictive.

Suitable examples of the polyfunctional crosslinking agent having an unsaturated bond may include: divinylbenzene, ethylene glycol dimethacrylate, triethylene glycol dimethacrylate, tetraethylene glycol dimethacrylate, 1,3-butylene glycol dimethacrylate, propylene glycol dimethacrylate, 1,4-butanediol dimethacrylate, 1,6-hexanediol dimethacrylate, neopentyl glycol dimethacrylate, allyl methacrylate, allyl acrylate, 2-hydroxy-1,3-dimethacryloxypropane, bisphenol dimethacrylates, alicyclic dimethacrylates, diacryl isocyanurate, trimethylolpropane trimethacrylate, triacrylformal, triacryl isocyanurate, triallyl isocyanurate, aliphatic triacrylates, pentaerythritol tetramethacrylate, pentaerythritol tetraacrylate, and aliphatic tetraacrylates, but these are not restrictive.

As the radical generator, various organic peroxides may be used including, as suitable examples, dialkyl peroxides, such as di-t-butyl peroxide; diacyl peroxides, such as benzoyl peroxide; peroxyketals, such as 2,5-dimethyl-di(t-butylperoxy) hexane; and di-n-peroxydicarbonates, but these are not restrictive.

Further, in addition to the above-mentioned polyamine, polyol, polymerizable crosslinking agent and radical generator, it is also possible to add, as a vulcanization accelerator, a compound which promotes the defluorination of vinylidene fluoride but per se is not readily added. Examples of the vulcanization accelerator may include organic phosphonium salts and quaternary ammonium salts represented by $R_4P^+X^-$ and $R_4N^+X^-$.

As another method of crosslinking the polymer electrolyte, the irradiation with electron beam or γ-rays may suitably be adopted for introducing the crosslinking structure. The radiation dose in this instance may suitably be on the order of 10-500 kGy. In order to enhance the radiation crosslinking effect, it is also suitable to add a polymerizable crosslinking agent having an unsaturated bond as mentioned above in the solid polymer electrolyte in advance.

The positive electrode 2 and the negative electrode 3 may be obtained by forming a positive composite electrode layer 2b and a negative composite electrode layer 3b in thicknesses of, e.g., 10-1000 pm on, e.g., one surface each of electroconductive substrates 2a and 3a comprising a metal foil or metal net comprising iron, stainless steel, copper, aluminum, nickel, titanium, etc. in thicknesses of 5-100 μm, e.g., 5-20 μm in case of small-sized devices.

The positive composite electrode layer 2b and 3b may for example be obtained by applying and drying an electrode-forming slurry composition formed, e.g., by dispersing 1-20 wt. parts of powdery electrode materials (positive or negative electrode active substance, and optionally added electroconductivity imparting agent and other additives) in 100 wt. parts of a solution of a vinylidene fluoride copolymer in general inclusive of the above-mentioned vinylidene fluoride copolymer and an electrolytic solution in a volatile organic solvent.

Preferred active substances for lithium ion secondary batteries may include: for positive electrodes, complex metal chalogenides represented by a general formula of $LiMY_2$ (wherein M denotes at least one species of transition metals, such as Co, Ni, Fe, Mn, Cr and V; and Y denotes a chalcogen such as O or S), particularly complex metal oxides as represented by $LiNi_xCo_{1-x}O_2$ ($0 \leq x \leq 1$) and complex metal oxides having a spinel structure, such as $LiMn_2O_4$.

Active substances for negative electrodes may include: carbonaceous materials, such as graphite, activated carbon, calcined and carbonized products of phenolic resin and pitch, and coconut shell-based activated carbon, and metal oxides, such as GeO, $GeO_2$, SnO, $SnO_2$, PbO, $PbO_2$, SiO, $SiO_2$, etc., and complex metal oxides of these.

The thus-formed laminated sheet-form battery structure shown in FIG. 1 may be, as desired, further laminated as by winding or folding to provide an increased electrode area per unit volume, and subjected to a treatment, such as enclosure within a relatively simple container and formation of lead electrodes, to provide a non-aqueous battery having an entire structure of, e.g., a rectangle, a cylinder, a coin or a papersheet.

EXAMPLES

Hereinbelow, the present invention will be described more specifically with reference to Examples and Comparative Examples.

Incidentally, abnormal linkage contents in vinylidene fluoride polymers described in Examples below were measured according to the following method.

[Measurement of Abnormal Linkage Content]

The abnormal linkage content of a vinylidene fluoride polymer is determined from absorption peaks of its $^{19}$F-NMR spectrum.

More specifically, ca. 5 mg of a vinylidene fluoride polymer sample is dissolved in a solvent mixture of 0.4 ml of dimethylformamide (DMF) and 0.1 ml of deuterium dimethylformamide (DMF-$d_7$) as a solvent for NMR measurement, and the resultant solution is subjected to the $^{19}$F-NMR measurement at room temperature.

A resultant $^{19}$F-NMR spectrum generally exhibits plural peaks.

Among these peaks, peaks at −113.5 ppm and −115.9 ppm with reference to $CFCl_3$ are identified as peaks attributable to the abnormal linkage.

The abnormal linkage content is determined as follows. The areas of peaks in the range of −90 ppm to −115.9 ppm are respectively measured and summed up to provide a total area $S_0$. On the other hand, the areas of the peaks at −113.5 ppm and −115.9 ppm are denoted by $S_1$ an $S_2$, respectively. Then, the abnormal linkage content is calculated according to the following formula:

Abnormal Linkage Content $=[\{(S_1+S_2)/2\}/S_0]\times 100(\%)$ (Preparation of Vinylidene Fluoride Copolymers)

Polymer Preparation Example 1

Into an autoclave having an inner volume of 2 liters, 1075 g of deionized water, 0.42 g of methyl cellulose, 2.9 g of diisopropyl peroxydicarbonate, 378 g of vinylidene fluoride and 42 g of hexafluoropropylene were charged and subjected to 10 hours of suspension polymerization at 29° C. After completion of the polymerization, the polymerization slurry was dewatered, washed with water and dried at 80° C. for 20 hours to obtain a polymer powder. The polymerization yield was 89 wt. %, and the resultant polymer showed an inherent viscosity of 1.7 dl/g. As a result of $^{19}$F-NMR analysis, the polymer exhibited a weight ratio of vinylidene fluoride to hexafluoropropylene of 93:7, and an abnormal linkage (head-head or tail-tail linkage) content at vinylidene fluoride sites of 3.6%.

Polymer Preparation Example 2

Into an autoclave having an inner volume of 2 liters, 1036 g of deionized water, 0.40 g of methyl cellulose, 2.8 g of diisopropyl peroxydicarbonate, 376 g of vinylidene fluoride and 4 g of trichlorofluoroethylene were charged and subjected to 16 hours of suspension polymerization at 28° C. while adding 20 g of trifluorochloroethylene in division of 1 g each at every 30 minutes from 2 hours after the start of the polymerization. After completion of the polymerization, the polymerization slurry was dewatered, washed with water and dried at 80° C. for 20 hours to obtain a polymer powder. The polymerization yield was 86 wt. %, and the resultant polymer showed an inherent viscosity of 1.8 dl/g. As a result of $^{19}$F-NMR analysis, the polymer exhibited a weight ratio of vinylidene fluoride to trifluorochloroethylene of 95:5.

Polymer Preparation Example 3

Into an autoclave having an inner volume of 2 liters, 1075 g of deionized water, 0.42 g of methyl cellulose, 2.9 g of diisopropyl peroxydicarbonate, 365 g of vinylidene fluoride, 30 g of hexafluoropropylene and 25 g of trifluorochloroethylene were charged and subjected to 11 hours of suspension polymerization at 29° C. After completion of the polymerization, the polymerization slurry was dewatered, washed with water and dried at 80° C. for 20 hours to obtain a polymer powder. The polymerization yield was 90 wt. %, and the resultant polymer showed an inherent viscosity of 1.8 dl/g. As a result of $^{19}$F-NMR analysis, the polymer exhibited weight ratios of vinylidene fluoride to hexafluoropropylene to trifluorochloroethylene of 90:5:5.

Polymer Preparation Example 4

Into an autoclave having an inner volume of 2 liters, 1140 g of deionized water, 0.29 g of methyl cellulose, 4.4 g of diisopropyl peroxydicarbonate, 326 g of vinylidene fluoride and 52 g of hexafluoropropylene were charged and subjected to 11 hours of suspension polymerization at 29° C. while adding 204 g of vinylidene fluoride in division of 17 g each at every 25 minutes from 3 hours after the start of the polymerization. After completion of the polymerization, the polymerization slurry was dewatered, washed with water and dried at 80° C. for 20 hours to obtain a polymer powder. The polymerization yield was 90 wt. %, and the resultant polymer showed an inherent viscosity of 1.7 dl/g. As a result of $^{19}$F-NMR analysis, the polymer exhibited a weight ratio of vinylidene fluoride to hexafluoropropylene of 93:7.

Polymer Preparation Example 5

Into an autoclave having an inner volume of 2 liters, 1075 g of deionized water, 0.21 g of methyl cellulose, 2.9 g of diisopropyl peroxydicarbonate, 378 g of vinylidene fluoride and 42 g of hexafluoropropylene were charged and subjected to suspension polymerization at 29° C. for 6 hours. When the pressure was lowered by 0.3 MPa from the pressure at the start of the polymerization, the temperature was raised to 40° C., and polymerization was performed for further 6 hours. After completion of the polymerization, the polymerization slurry was dewatered, washed with water and dried at 80° C. for 20 hours to obtain a polymer powder. The polymerization yield was 84 wt. %, and the resultant polymer showed an inherent viscosity of 1.7 dl/g. As a result of $^{19}$F-NMR analysis, the polymer exhibited a weight ratio of vinylidene fluoride to hexafluoropropylene of 93:7, and an abnormal linkage content at vinylidene fluoride sites of 4.0%.

Polymer Preparation Example 6

Into an autoclave having an inner volume of 2 liters, 1075 g of deionized water, 0.21 g of methyl cellulose, 2.9 g of diisopropyl peroxydicarbonate, 370 g of vinylidene fluoride and 50 g of hexafluoropropylene were charged and subjected to 18 hours of suspension polymerization at 29° C. After completion of the polymerization, the polymerization slurry was dewatered, washed with water and dried at 80° C. for 20 hours to obtain a polymer powder. The polymerization yield was 89 wt. %, and the resultant polymer showed an inherent viscosity of 1.9 dl/g. As a result of $^{19}$F-NMR analysis, the polymer exhibited a weight ratio of vinylidene fluoride to hexafluoropropylene of 91:9.

Polymer Preparation Example 7

Into an autoclave having an inner volume of 2 liters, 1075 g of deionized water, 0.21 g of methyl cellulose, 2.1 g of diisopropyl peroxydicarbonate, 378 g of vinylidene fluoride and 42 g of hexafluoropropylene were charged and subjected to 8 hours of suspension polymerization at 29° C. After completion of the polymerization, the polymerization slurry was dewatered, washed with water and dried at 80° C. for 20 hours to obtain a polymer powder. The polymerization yield was 88 wt. %, and the resultant polymer showed an inherent viscosity of 2.5 dl/g. As a result of $^{19}$F-NMR analysis, the polymer exhibited a weight ratio of vinylidene fluoride to hexafluoropropylene of 93:7.

Example 1

10 g of the polymer obtained in Polymer Preparation Example 1 and 100 g of a mixture solution of ethylene carbonate, propylene carbonate and tetrahydrofuran (in mixing weight ratios of 15:15:70) were blended to form a solution. The solution was cast, and the tetrahydrofuran was removed therefrom by air drying to form a ca. 80 μm-thick gel-form film containing the ethylene carbonate and propylene carbonate at ca. 75 wt. %. (As a result of weighing of the resultant gel-form film, a weight loss corresponding to the used tetrahydrofuran was confirmed.)

According to ASTM D882, a test piece was cut out from the gel-form film in a test length of 20 mm and a test width of 10 mm and subjected to measurement of a tensile strength at a tensile speed of 100 mm/min. by using TENSILON UTM-III-100 (made by TOYO BALDWIN K. K.), whereby a value of 2.54 MPa was obtained.

Example 2

A ca. 100 μm-thick gel-form film containing ca. 75 wt. % of ethylene carbonate and propylene carbonate was obtained in the same manner as in Example 1 except for using the polymer obtained in Polymer Preparation Example 2. As a result of weighing of the gel-form film, a weight loss corresponding to the used tetrahydrofuran was confirmed.

As a result of a tensile strength measurement of the gel-form film in the same manner as in Example 1, a value of 2.01 MPa was obtained.

Example 3

A ca. 100 μm-thick gel-form film containing ca. 75 wt. % of ethylene carbonate and propylene carbonate was obtained in the same manner as in Example 1 except for using the polymer obtained in Polymer Preparation Example 3. As a result of weighing of the gel-form film, a weight loss corresponding to the used tetrahydrofuran was confirmed.

As a result of a tensile strength measurement of the gel-form film in the same manner as in Example 1, a value of 1.54 MPa was obtained.

Comparative Example 1

A ca. 100 μm-thick gel-form film containing ca. 75 wt. % of ethylene carbonate and propylene carbonate was obtained in the same manner as in Example 1 except for using as the polymer "KYNAR 2801" (more specifically "Kynar FLEX 2801" made by Atochem Co., a vinylidene fluoride/hexafluoropropylene copolymer; a vinylidene fluoride/hexafluoropropylene nominal weight ratio=88/12. According to the inventors' measurement, vinylidene fluoride/hexafluoropropylene weight ratio=90/10 based on NMR analysis and inherent viscosity=1.2 dl/g). As a result of weighing of the gel-form film, a weight loss corresponding to the used tetrahydrofuran was confirmed.

As a result of a tensile strength measurement of the gel-form film in the same manner as in Example 1, only a weak strength of 0.76 MPa was obtained.

Example 4

In a nitrogen atmosphere having a dew point of below −70° C., 10 g of the polymer obtained in Polymer Preparation Example 1 and 5 g of LiPF$_6$ were blended with 100 g of a solution mixture of ethylene carbonate, propylene carbonate and tetrahydrofuran (in mixing wt. ratios of 15:15:70) to form a solution. The solution was cast, and the tetrahydrofuran was removed by air drying to form a ca. 80 μm-thick gel-form polymer electrolyte film. As a result of weighing of the resultant gel-form polymer electrolyte film, a weight loss corresponding to the used tetrahydrofuran was confirmed.

The gel-form polymer electrolyte exhibited little exudation of the electrolytic solution and was found to be soft, stretchable and strong as a result of pulling by hands. A test piece of 50 mm×50 mm was cut out from the gel-form polymer electrolyte film and, after weighing, stored for 2 weeks at −18° C., followed by restoration to room temperature, light wiping of the film surface to remove the electrolytic solution at the film surface and weighing to determine a percentage weight loss due to exudation for evaluating the electrolytic solution-retentivity. Herein, the percentage weight loss is given by ((weight before storage−weight after storage)/(weight before storage))×100, and a smaller value indicates a stabler electrolytic solution-retentivity with time. The percentage weight loss was a small value of 0.38%, thus indicating an excellent electrolytic solution-retentivity.

Example 5

A ca. 80 μm-thick gel-form polymer electrolyte film was prepared in the same manner as in Example 4 except for using the polymer prepared in Polymer Preparation Example 2. As a result of evaluation of electrolytic solution-retentivity of the gel film in the same manner as in Example 4, the percentage weight loss due to exudation was as small as 0.11%, thus indicating an excellent electrolytic solution-retentivity.

Example 6

A ca. 80 μm-thick gel-form polymer electrolyte film was prepared in the same manner as in Example 4 except for using the polymer prepared in Polymer Preparation Example 3. As a result of evaluation of electrolytic solution-retentivity of the gel film in the same manner as in Example 4, the percentage weight loss due to exudation was as small as 0.49%, thus indicating an excellent electrolytic solution-retentivity.

Comparative Example 2

A ca. 80 µm-thick gel-form polymer electrolyte film was prepared in the same manner as in Example 4 except for using as the polymer "KYNAR 2801" (vinylidene fluoride/hexafluoropropylene weight ratio=88/12, inherent viscosity 1.2 dl/g). As a result of weighing of the resultant gel-form polymer electrolyte film, a weight loss corresponding to the used tetrahydrofuran was confirmed.

The gel-form polymer electrolyte film exhibited exudation of the electrolytic solution and a clearly inferior strength than those of Examples 4 and 5. Further, as a result of evaluation of electrolytic solution-retentivity in the same manner as in Example 4, the percentage weight loss due to exudation was as large as 1.50%, thus indicating an inferior electrolytic solution-retentivity.

Example 7

10 g of the polymer obtained in Polymer Preparation Example 3 was dissolved in 90 g of tetrahydrofuran, and 0.5 g of hexamethylenediamine as a crosslinking agent and 0.5 g of carbon black as an accelerator were added thereto to prepare a first solution. Then, 4.5 g of $LiPF_6$ was dissolved in 3 ml of a mixture solution of propylene carbonate and ethylene carbonate in a volume ratio of 1:1 to prepare a second solution. The first solution and the second solution were blended and well stirred for 12 hours at 50° C., followed by casting onto a glass sheet and removal of the tetrahydrofuran by air drying to obtain a gel-form polymer electrolyte film. As a result of weighing of the resultant ca. 80 µm-thick gel film, a weight loss corresponding to the used tetrahydrofuran was confirmed.

As a result of tensile strength measurement of the gel-form film in the same manner as in Example 1, a value of 3.61 MPa was obtained.

Then, as a heat resistance test, the gel-form film was hermetically sealed up in a glass bottle and heated for 1 hour within an oven at 100° C., followed by taking out and cooling to room temperature. The gel-form film after the cooling retained its original shape without melting during the heating.

Example 8

In a nitrogen atmosphere having a dew point of below –70° C., 10 g of the polymer prepared in Polymer Preparation Example 1 and 5 g of $LiPF_6$ were dissolved in 100 g of a mixture solution of propylene carbonate, ethylene carbonate and dimethyl carbonate (in mixing wt. ratios of 15:15:70) to form a first solution. On the other hand, 7 g of polyvinylidene fluoride ("KF#1300", made by Kureha Kagaku K. K.; inherent viscosity=1.30 dl/g) was mixed with 85 g of $LiCoO_2$, 8 g of electroconductive carbon black and 60 g of N-methyl-2-pyrrolidone, and the resultant slurry was applied on a 10 pm-thick aluminum foil, followed by vaporization removal of the N-methyl-2-pyrrolidone to form a ca. 110 µm-thick dry electrode (positive electrode). Further, 10 g of polyvinylidene fluoride ("#9100", made by Kureha Kagaku K. K.; inherent viscosity=1.10 dl/g) was mixed with 90 g of a pitch-based porous carbonaceous material and 90 g of N-methyl-2-pyrrolidone, and the resultant slurry was applied onto a 10 µm-thick copper foil, followed by vaporization removal of the N-methyl-2-pyrrolidone to form a ca. 105 µm-thick dry electrode (negative electrode).

Then, the first solution was divided into equal halves which were then separately applied onto the active substances of the positive electrode and the negative electrode, followed by air drying to cause evaporation-off of ca. 60 g of the dimethyl carbonate having a lower boiling point and form a gel-form polymer electrolyte layer on the positive and negative electrodes. The positive electrode and the negative electrode each coated with the gel layer were laminated with their gel layers inside by a double roller laminator, thereby forming a paper-form battery having a total thickness of ca. 0.7 mm including a battery case.

The paper-form battery was bent at 90 deg. and, in the bent state, subjected to a charging operation according to a constant current-constant voltage charging method wherein the battery was first charged at a current density of 1.8 $mA/cm^2$ up to a battery voltage of 4.2 volts and then held at a constant voltage of 4.2 volts within a total changing time not exceeding 3.5 hours, followed by a discharging operation according to a constant current discharging method wherein the battery was discharged at a current density of 1.8 $mA/cm^2$ down to a final voltage of 2.5 volts. In the first cycle, the battery exhibited a charging capacity of 332 mAh/g (carbon material) and a discharge capacity of 287 mAh/g (carbon material). On further repetition of the charge-discharge cycles, the discharge capacity at 20th-cycle was 97% of the capacity at the first cycle. During the cycles, the charge-discharge operations were smoothly performed without causing liquid leakage.

Comparative Example 3

A paper-form battery was prepared in the same manner as in Example 8 except for using as the polymer "KYNAR 2801" (vinylidene fluoride/hexafluoro-propylene weight ratio=88/12, inherent viscosit=1.2). The same charge-discharge test in a bent state at 90 deg. as in Example 8 was tried to be applied to the battery, whereas a short circuit between the positive and negative electrodes was caused presumably due to breakage of the gel electrolyte layer so that the charging was failed.

Example 9

A ca. 100 µm-thick gel-form film containing ca. 75 wt. % of ethylene carbonate and propylene carbonate was prepared in the same manner as in Example 1 except for using the polymer obtained in Polymer Preparation Example 4. As a result of weighing of the gel-form film, a weight was corresponding to the used tetrahydrofuran was confirmed. As a result of a tensile strength measurement of the gel-form film, a value of 1.68 MPa was obtained.

A ca. 80 µm-thick gel-form polymer electrolyte film was prepared in the same manner as in Example 4 except for using the polymer obtained in Polymer Preparation Example 4. As a result of evaluation of electrolytic solution-retentivity of the gel film in the same manner as in Example 4, the percentage weight loss due to exudation was at a small value of 0.53%, thus exhibiting an excellent electrolytic solution-retentivity.

The above Examples are comparable to Examples 1 and 4 in respects of polymer composition and inherent viscosity. Thus, it is understood that the polymer of Polymer Preparation Example 1 obtained by polymerization of the monomers charged simultaneously provided higher strength and higher electrolytic solution-retentivity than the polymer of Polymer Preparation example 4 obtained by polymerization of the monomers charged in division.

Example 10

A ca. 100 µm-thick gel-form film containing ca. 75 wt. % of ethylene carbonate and propylene carbonate was prepared in the same manner as in Example 1 except for using the polymer obtained in Polymer Preparation Example 5. As a result of weighing of the gel-form film, a weight was corresponding to the used tetrahydrofuran was confirmed. As a result of a tensile strength measurement of the gel-form film, a value of 2.22 MPa was obtained.

A ca. 80 µm-thick gel-form polymer electrolyte film was prepared in the same manner as in Example 4 except for using the polymer obtained in Polymer Preparation Example 5. As a result of evaluation of electrolytic solution-retentivity of the gel film in the same manner as in Example 4, the percentage weight loss due to exudation was as small as 0.13%, thus exhibiting an excellent electrolytic solution-retentivity.

The above Examples are comparable to Examples 1 and 4 in respects of polymer composition and inherent viscosity. Thus, it is understood that the polymer of Polymer Preparation Example 5 obtained through a higher polymerization temperature provided a higher electrolytic solution-retentivity than the polymer of Polymer Preparation example 1 obtained at a lower polymerization temperature. This may be understood as a result of an increased abnormal linkage content owing to an elevated polymerization temperature.

Example 11

A ca. 100 µm-thick gel-form film containing ca. 75 wt. % of ethylene carbonate and propylene carbonate was prepared in the same manner as in Example 1 except for using the polymer obtained in Polymer Preparation Example 6. As a result of weighing of the gel-form film, a weight was corresponding to the used tetrahydrofuran was confirmed. As a result of a tensile strength measurement of the gel-form film, a value of 1.45 MPa was obtained.

A ca. 80 µm-thick gel-form polymer electrolyte film was prepared in the same manner as in Example 4 except for using the polymer obtained in Polymer Preparation Example 6. As a result of evaluation of electrolytic solution-retentivity of the gel film in the same manner as in Example 4, the percentage weight loss due to exudation was as small as 0.10%, thus exhibiting an excellent electrolytic solution-retentivity.

Example 12

A ca. 100 µm-thick gel-form film containing ca. 75 wt. % of ethylene carbonate and propylene carbonate was prepared in the same manner as in Example 1 except for using the polymer obtained in Polymer Preparation Example 7. As a result of weighing of the gel-form film, a weight was corresponding to the used tetrahydrofuran was confirmed. As a result of a tensile strength measurement of the gel-form film, a value of 2.76 MPa was obtained.

A ca. 80 µm-thick gel-form polymer electrolyte film was prepared in the same manner as in Example 4 except for using the polymer obtained in Polymer Preparation Example 7. As a result of evaluation of electrolytic solution-retentivity of the gel film in the same manner as in Example 4, the percentage weight loss due to exudation was as small as 0.07%, thus exhibiting an excellent electrolytic solution-retentivity.

[Industrial Applicability]

As is clear from the above Examples and Comparative Examples, according to the present invention, it is possible to obtain a polymer electrolyte present in a state of containing much nonaqueous electrolytic solution and exhibiting an excellent strength in this state by using a vinylidene fluoride copolymer having a high vinylidene fluoride content and a high inherent viscosity. Further, by using the polymer electrolyte, it is possible to obtain a nonaqueous battery having stable strength and properties and also a high shape latitude.

The invention claimed is:

1. A non-aqueous battery, comprising: a positive electrode comprising a positive electrode material capable of being doped with and liberating lithium, a negative electrode material capable of being doped with and liberating lithium, and a gel polymer film impregnated with a liquid solution of electrolyte produced by a process comprising:

dissolving a vinylidene fluoride copolymer and a nonaqueous electrolytic solution with a solvent that can be evaporated to form a solution, wherein the vinylidene fluoride copolymer comprises 80 to 97 wt. % of vinylidene fluoride monomer units and 3 to 20 wt. % of units of at least one monomer copolymerizable with vinylidene fluoride monomer, and has an inherent viscosity of 1.7 to 7 dl/g as measured at 30° C. in a solution at a concentration of 4 g of polymer in 1 liter of N,N-dimethylformamide, forming a film of the solution, and evaporating the solvent from the film of the solution to form a gel polymer electrolyte in the form of a film comprising the vinylidene fluoride copolymer impregnated with 75-85 wt. % of the nonaqueous electrolytic solution.

2. The non-aqueous battery according to claim 1, wherein the vinylidene fluoride copolymer has an inherent viscosity of 1.8 to 7 dl/g.

3. The non-aqueous battery according to claim 1, wherein said at least one monomer copolymerizable with vinylidene fluoride monomer comprises a mixture of hexafluoropropylene monomer and trifluorochloroethylene monomer.

4. The non-aqueous battery according to claim 1, wherein the vinylidene fluoride copolymer is crosslinked.

5. The non-aqueous battery according to claim 4, wherein the vinylidene fluoride copolymer is crosslinked in the presence of (1) a crosslinking agent selected from the group consisting of polyamides, polyols and polymerizable crosslinking agents having an unsaturated bond, and (2) a radical generating agent.

6. The non-aqueous battery according to claim 4, wherein the vinylidene fluoride copolymer is crosslinked by irradiation with electron rays or gamma rays.

* * * * *